US005665810A

United States Patent [19]
Patchett et al.

[11] Patent Number: 5,665,810
[45] Date of Patent: Sep. 9, 1997

[54] PUNCTURE RESISTANT MATERIAL

[76] Inventors: Kim Patchett, 103 Bradleigh Avenue, RM17 5RH Grays, Essex, United Kingdom; Stuart Ian Wallace, 51 Second Avenue, CO13 9LY Flinton-On-Sea, Essex, United Kingdom

[21] Appl. No.: 455,163

[22] Filed: May 31, 1995

[30]     Foreign Application Priority Data

May 31, 1994 [GB] United Kingdom ............... 9410849.5
Dec. 7, 1994 [GB] United Kingdom ............... 9424773.1

[51] Int. Cl.[6] ............... C08K 3/34; F41H 1/02; A41D 19/00; B32B 19/02
[52] U.S. Cl. ............... 524/449; 524/451; 2/2.5; 2/161.7; 2/163; 2/168; 2/169; 428/325; 428/327; 428/328; 428/911
[58] Field of Search ............... 524/449, 441, 524/451; 2/2.5, 161.7, 163, 168–169; 428/33, 325, 327, 328, 911

[56]           References Cited

U.S. PATENT DOCUMENTS

| 5,138,719 | 8/1992 | Ordianges et al. | 512/168 |
| 5,200,263 | 4/1993 | Gould et al. | 428/323 |
| 5,368,930 | 11/1994 | Samples | 428/323 |

FOREIGN PATENT DOCUMENTS

| 35 11 801 A1 | 3/1985 | Germany . |
| 60-228235 | 11/1985 | Japan . |
| WO93/21492 | 10/1993 | WIPO . |
| WO94/09965 | 5/1994 | WIPO . |

OTHER PUBLICATIONS

Jane Hollway, Safety from Sharps, British Journal of Nursing, vol. 1, No. 8, 1992, pp. 389–390.
S.A. Hussain et al, Risks to Surgeons: A Survey of Accidental Injuries During Operations, British Journal of Surgery, vol. 75, Apr. 1988, pp. 314–316.
Michael P. Corlett et al, Reduction in Incidence of Glove Perforation during Laparotomy Wound Closure by 'No Touch'Technique, Annals of the Royal College of Surgeons of England, vol. 75, 1993, pp. 330–332.
C. Wastell et al, Safe Surgical Environment?, Abstract from Presentation, Satellite Symposium, Chirurngendagen, May 1993.
Lynn Parker, HIV Transmission, Nursing Times, vol. 88, No. 45, Nov. 1992, pp. 56 and 58.
A.E. Camilleri et al., Needlestick Injury In Surgeons: What is the Incidence?, J.R. Coll. Surg. Edinb., vol. 36, Oct. 1991, pp. 317–318.
Database WPI Week 8601, Derwent Publications Ltd., GB; AN 86–002996.

*Primary Examiner*—Peter A. Szekely
*Attorney, Agent, or Firm*—Lowe, Price, LeBlanc & Becker

[57]           ABSTRACT

The invention provides a puncture resistant polymeric sheet material (1) comprising a plurality of discrete platelets (2) disposed substantially parallel to the plane of the sheet material in an overlapping interrelation, wherein the disposition of the platelets in the sheet material has been effected by pressure-forming. As shown in FIG. 5, pressure-forming techniques result in an decrease in penetration by a factor of up to four.

12 Claims, 5 Drawing Sheets

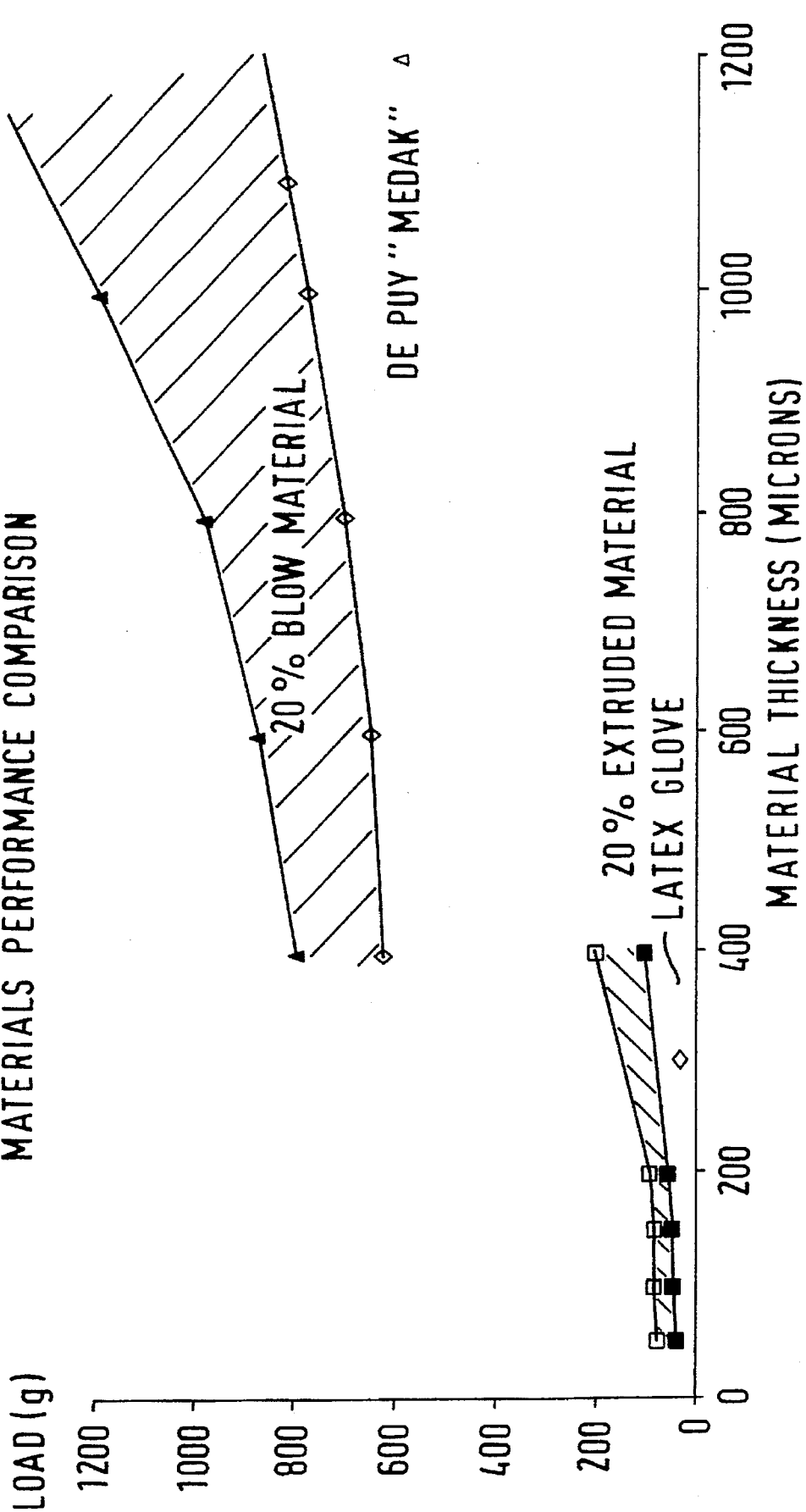

PUNCTURE RESISTANT MATERIAL

FIELD OF THE INVENTION

The present invention relates to a puncture resistant material for use in a garment where the garment is intended to offer a significant level of protection against puncture from alien objects.

BACKGROUND ART

Materials offering varying degrees of such protection for different applications are known, for example those used in items such as bullet resistant vests, surgical and garden gloves etc. The principal requirement of such materials is that they safely perform the function for which they are intended, i.e. that they afford at least the required degree of protection. With garden gloves for example, the gloves are intended to offer the wearer sufficient protection against injury from for example thorns. With a bullet resistant vest, clearly the vest must be able to prevent penetration from bullets. In all cases, the item should ideally not detrimentally affect the activities of the wearer and be as comfortable as possible to wear. Thus for garden gloves, as well as providing protection to the wearer, the gloves should be sufficiently flexible and offer adequate sensitivity so as not to inhibit the gardening activities of the wearer.

The flexibility and sensitivity of a garment will depend on the characteristics and dimensions of the material from which it is made. Generally speaking a thicker material will offer less flexibility and sensitivity than a thinner material.

In certain applications there is therefore often a compromise between protection and flexibility/sensitivity with regard to the material thickness. For example for surgical gloves the requirements of flexibility and sensitiveness are paramount, bearing in mind the delicate operations a surgeon has to perform. Ideally therefore the material should be as thin as possible.

In this connection most surgical gloves currently in use are made from latex, an elastic material which can be made sufficiently thin so as to offer the required degree of flexibility and sensitivity for delicate operative techniques.

The choice of latex for surgeon's gloves has in the past arisen predominantly out of the flexibility and sensitivity necessities and has in a protection point of view been in the patient's rather than the surgeon's interests, i.e. for the purpose of maintaining as sterile conditions as possible for the patient so as to minimise the risks of infection. However the use of surgical gloves is now also becoming vital in the role of providing protection for the surgeon against accidental self inflicted injuries that regularly occur by way of so-called 'needle stick' accidents. Such accidents occur for example when a surgeon inadvertently stabs himself or herself with a needle or scalpel blade that is being used. Protection in the form of gloves is thus utilised by surgeons and other health workers to reduce the risk of infection to themselves in such circumstances.

The puncture resistance of latex gloves is however minimal such that with current concerns in relation to accidental infection of diseases such as HIV (human immunodeficiency virus) and Hepatitis A,B,C,D and E and in the absence of any better alternative, surgeons are often 'double gloving', namely wearing two latex gloves on each hand, one on top of another, to reduce the risks of glove puncture and thus infection. Clearly the use of two gloves in this way can only detrimentally lessen the flexibility and touch sensitivity of the glove to the wearer.

There are known materials in the field of armoured clothing, for example as disclosed in co-pending application No. WO 93/21492, which are puncture resistant and are directed to affording protection from projectiles, e.g. bullets. However such materials are generally heavy duty and cannot by virtue of their interlocking construction provide the degree of flexibility required for delicate applications.

There are also materials available which are primarily cut or slash resistant in that they offer the wearer of a garment made from such a material increased protection against cuts and slashes made across the material. This is useful for providing protection against, say scalpel wounds. Such materials are however not notably puncture resistant.

US-A-5200263 and US-A-5138719 both disclose puncture resistant materials which comprise a plurality of flat platelets formed either of metal discs or carbon fibres which are disposed within the material. Such materials are made by dipping a former into a polymeric material, for example, a latex usually used for glove formation into which has been disposed a plurality of platelets. By virtue of the dipping procedure the platelets to a certain extent orientate in the latex material, but always at the junction of overlaying layers of latex.

Materials such as those disclosed in these citations do in fact increase penetration resistance to needle stick but not to the necessary degree, due possibly to a failure of the dipping process to reliably align the platelets, particularly when these are of small size, parallel to the plane of the material.

Latex gloves such as those commonly used by surgeons have relatively low puncture resistance. As shown in FIG. 5 which follows, for example, single glove thicknesses have a penetration resistance of about 20 grams and double gloves tend to have a penetration resistance of 40 grams. By way of comparison, leather with an equivalent thickness will have a static load resistance of a little over 200 grams while a Medak glove which is some six times thicker and hence is quite unsuited to surgical use other than for orthopaedic procedures will resist a little over 600 grams static load.

SUMMARY OF THE INVENTION

The present invention seeks to provide in one aspect a puncture resistant sheet material able to reliably withstand 1000 grams static loading while still maintaining flexibility, sensitivity, and impermeability.

The applicants have found that this may be achieved by using pressure-forming techniques since it is believed these act upon the platelets in an unformed polymer mix to orientate them more precisely parallel to the plane of the material in the overlapped condition.

Accordingly therefore, the present invention provides a puncture resistant polymeric sheet material comprising a plurality of discrete platelets disposed substantially parallel to the plane of the sheet material in an overlapping orientation;

characterised in that the orientation of the platelets in the sheet material has been effected by aligning platelets within the polymeric material by subjecting it to positive or negative pressure when plastic during the forming process.

By this means, at least a majority of the platelets are aligned so as to be substantially parallel to the opposed surfaces of the sheet material and in an overlapped position such that the sheet material can reliably resist penetration. The puncture resistant polymeric sheet material is preferably formed into its final shape by stretch blow moulding and hence is particularly suited to the production of gloves, although other blow moulded items may similarly be formed. In a preferred form of the invention, the material has a thickness of more than 200 μm and can withstand a needle point loading above 500 grams.

At least the majority of platelets are provided in overlapping interrelation. It is nevertheless desirable for a small proportion, for example, less than 10% to be angled to the plane of orientation of the majority of the platelets.

The reason for this is to assist in the prevention of a needle suture point sliding on the high aspect ratio surface of the platelets disposed in the material and hence causing penetration by sliding between adjacent platelets. The angled platelets tend to resist this lateral movement and hence resist tearing of the material.

The puncture resistant qualities of the material depend to an extent upon the geometry of the platelets. These may be apertured (e.g. doughnut shaped) allowing a needle tip to locate therein to effectively increase the needle tip load distribution. Alternatively or additionally the platelets may have a contoured surface, with ridges or dimples for example, to reduce the skidding of the needle tip in use. The platelets need not be uniform in size or shape and particularly short reinforcement fibres may be added to the material to increase its tensile strength.

Although any suitable platelets may be used, for example metal platelets, in a preferred embodiment, the platelets comprise a high aspect ratio ceramic material. The polymer is preferably an elastomer such as a polyurethane or a polyalkylene, styrene block copolymers or a synthetic rubber such as nitrile rubber.

According to a second aspect of the present invention, there is a provided a method of manufacturing a puncture resistant sheet or article of clothing comprising the steps of:

(a) mixing discrete platelets with a polymer to form a mixture wherein the platelets are randomly orientated, (b) curing the mixture optionally with pressure and/or heat to form a parison, and subsequently, (c) heating the parison and subjecting it to positive or negative pressures, e.g. blow moulding or vacuum moulding, to form a sheet or article of clothing in which at least a majority of the platelets are pressure orientated so as to be aligned in an overlapping relationship and generally parallel to the opposed faces of the material forming the sheet or article of clothing. The parison may be moulded by injection or indeed extrusion moulding so long as the final product is made by for example vacuum forming or blow moulding.

In a preferred form of the invention, a compatible polymer is co-extruded on at least one surface of the parison.

According to a final form of the invention, there is provided a parison for a puncture resistant article, said parison comprising an elastomer formed with 10–30% or even up to 60% by weight of ceramic platelets and overlayed on one surface by a compatible polymeric material by coextrusion.

BRIEF DESCRIPTION OF THE DRAWINGS

Embodiments of the present invention will now be described by way of illustration only, with reference to FIGS. 1 to 5 of the accompanying drawings in which:

FIG. 5 shows a graph of loadings withstood by various puncture resistant materials at various thicknesses.

DESCRIPTION OF THE PREFERRED EMBODIMENTS

The pressure-forming steps of the invention may be effected by blow moulding or vacuum forming.

(a) Extrusion Blow Moulding—is a process whereby a cylindrical parison of polymer in its hot, plastic state is introduced into a two piece tool that when closed, simultaneously seals the bottom of the parison and creates the means at the top of the tool for air to be blown into the top of the parison so that the parison inflates to follow the shape of the inner cavity of the tool. This type of blow moulding will result in a seam where the parison is sealed by the tool. The process allows for single layer or multi-layer structures to be formed (co-extrusion).

(b) Stretch Blow Moulding—is similar to conventional Extrusion Blow Moulding but a mechanism is incorporated into the tooling that mechanically stretches the parison along its length prior to the blowing stage. This mechanical stretching ensures bi-axial orientation of the polymer with associated improvements in the mechanical properties of the end product.

(c) Pre-Form Blow Moulding—is a process whereby a preformed shape is made by injection moulding or polymer dipping or similar and in a secondary process, the pre-form is heated and blown within a cavity mould into the required end product.

Vacuum forming requires the provision of negative pressure to the opposed surface of the parison and has the advantage of producing a seamless product.

Figure 1:
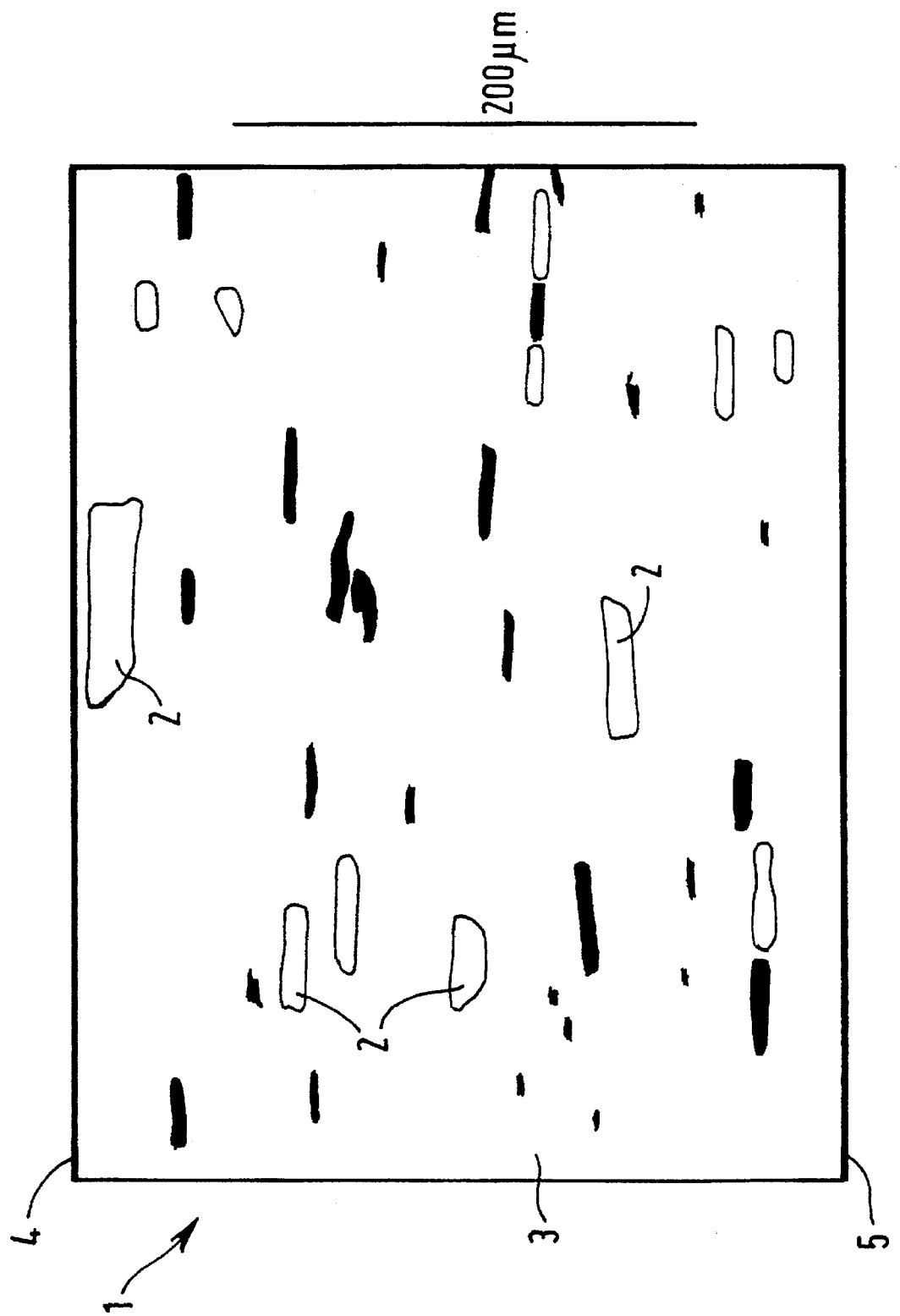
FIG. 1 shows in a sectional view as a photo-micrograph of the material in accordance with a preferred embodiment of the present invention.

FIG. 1 shows a cross-section through a material 1 according to an embodiment of the invention. The material comprises a plurality of platelets 2 suspended in an elastomer 3. The platelets are dispersed in a generally homogenous manner in the elastomer. Whilst the platelets may be formed of any suitable material, e.g. metal or plastics, FIG. 1 shows ceramic material and in particular, a ceramic silicate. Aluminia silicates are also a preferred choice.

The elastomer may be any suitable material for example, polyethylene, polypropylene and polyurethane. The elastomer provides the material with a degree of flexibility in all directions and should have a flexural modulus of <300 MPa and preferably <30 MPa. It will be noted that the platelets are generally aligned in the material such that at least a majority lie parallel to the upper and lower surfaces 4 and 5, also at least the majority of the platelets overlap one another so as to form a continuous barrier across the material. The overlapped nature of the platelets strengthens the barrier against puncture. The thickness or density of the material can be varied to meet particular anti-puncture requirements as desired. For the preferred embodiment of surgeon's glove as shown in FIG. 1, the material is arranged to be of the order of 250 microns thick thereby giving the required flexibility and touch sensibility. The high aspect platelets themselves are preferably 10 to 15 microns across and 1 to 5 microns deep. With these characteristics, the material can withstand an OS4 cutting suture needle, for example 50 mm long and 0.4 mm diameter, loading of 600 to 1200 grams. Of course for different applications, e.g. garden gloves, etc., these variables can be altered as required.

As shown in FIG. 1, there are a number of horizontally extending voids. These would normally be occupied by ceramic platelets but these were removed during preparation by polishing of the material for photomicrography.

The material may be provided at specific areas only of a garment. For example a glove may be provided with more or less reinforcement only at certain areas. Preferably an entire garment can be manufactured from the material but by means of co-extrusion, certain areas only may be provided with the ceramic reinforcement.

Figure 2:
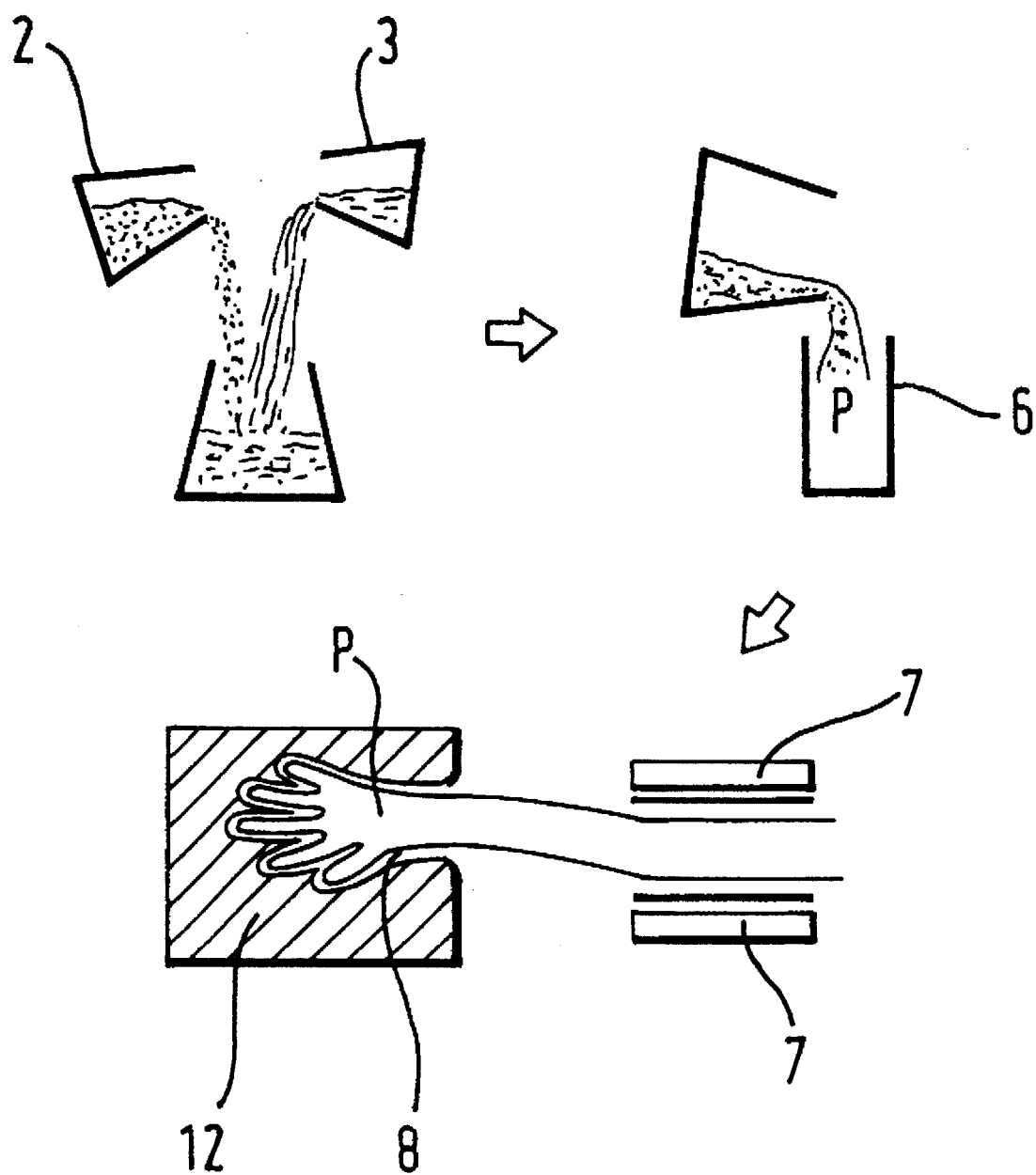
FIG. 2 shows a schematic view of a method of manufacture in accordance with the preferred embodiment in the invention.

A preferred method of production of the glove is shown schematically in FIG. 2. As shown, the liquid elastomer 3 has mixed into it microsized, preferably high aspect ratio, ceramic platelets 2 in powdered form. The resulting mixture is poured into a plug-shape mould 6 such that the mixture can initially set in the shape of a thin wall tube. Of course, any suitable shape may be formed. Thereafter a setting pressure P is preferably applied to the tube at a suitable pressure, such pressure preferably having a preliminary effecting in aligning the platelets so that they begin to become aligned substantially parallel to the surface of the material. The application of pressure to align the platelets of course could be provided as a completely separate step to that of the forming of the parison. In this regard, it will be appreciated that the method of manufacture may include curing the parison by any suitable means. These may include the inclusion of an additive, e.g. an accelerating agent and/or by use of heat and/or pressure.

Use of heat and/or pressure may however may have the above-mentioned advantageous effect in preliminarily aligning the platelets.

The shaped tube is then heated with heater 7 and blow moulded via mould 12 into the shape of a glove 8. During the blow moulding treatment, the material is compacted a second time under pressure to ensure alignment of at least a majority of the platelets. Whilst a method of manufacturing a glove is described above, the same method can of course be used to produce alternative items.

In an alternative method of producing articles of clothing in the present invention, the parison manufactured as produced above may be collapsed to form a substantially flat envelope of material. The profile of the desired article, e.g. a glove, can then be cut from the envelope using any suitable means, for example a laser. The use of a laser is particularly advantageous in that the edges of the opposed faces of the clothing article are fused together along the profile whilst being cut from the collapsed parison.

EXAMPLE 1

In a preferred method for the production of a glove in accordance with the present invention, the method of manufacture may be as follows:

mixture of polyurethane polymer (Estane; Registered Trade Mark) is admixed with various mixes of Ceramic platelets for example, 0%, 10%, 20% and most preferably 30% by weight. The resultant mixture is then heated and formed into rods and the rods are cut into pellets for further processing. Using other polymers, it is possible to load the material with up to 60% by weight or even higher if the base polymer is highly elastermeric. This is because the lower the flexural modulus of the polymer, the higher the loading of platelets which is possible.

These are all then melted and passed through a conventional screw extruder to form a tube shaped parison. The parison may alternatively be made by injection moulding. The so formed parison may be stored as such for future use for a considerable period. Subsequently the final shape, in this case a surgeon's glove, can be formed by moulding.

To this end, the parison is subjected to a primary formation step in which the tubular parison is closed at its remote end and a glove-shaped pre-form is formed. The glove-shaped pre-form is then introduced into a final blow moulding step and subjected to biaxial stretch blow moulding by heat and pressure to form the final glove shape, before being removed from the mould for cooling. As the step of blow moulding materials such as bottles is well known, the discovery by the applicant that significantly improved products could be produced by using blow moulding techniques for the formation of a product such as puncture resistant gloves incorporating ceramic particles is a significant advance since it leads to the production of articles having very much improved puncture resistant properties.

The materials formed by the above process were then tested against a commercially available latex glove, again the Du Puy (Medak) glove mentioned previously and against a glove material formed by traditional extrusion moulding techniques. The results are shown in FIG. 5. From this figure it will be seen that at 20% ceramic platelets, a blow moulded Estane glove having a final thickness of about 200 μm withstood a loading of between 600 to 800 grams while at the same thickness and using the same starting material, an extruded product could only withstand a static loading of the order of 100–200 grams.

The "Medak" glove product had a thickness of about 1200 μm and withstood a loading of 600 grams, while at that thickness the product in accordance of the present invention withstood a loading of between about 800 and 1400 grams. Whereas at 1200 μm the thickness of the inventive glove material is too great for surgical use, it is useful for gardening and industrial gloves and at that thickness is roughly twice as penetration resistant as the Medak glove. At 400 μm, the efficiency of the inventive product is of the order of four times that of the prior art result.

The gloves as shown in FIG. 5 are made in accordance with the product as shown in FIG. 1. On the scale shown in FIG. 1, a suture needle tip is in excess of one half of the horizontal transverse section as shown. It follows that the penetration of such a needle, however sharp, must be resisted by a significant number of horizontally overlapping platelets.

One of the problems however with the inventive glove product is that at the material surface the ceramic platelets tend to be dislodged. This happens because the platelets are either at the surfaces or immediately adjacent to them. This results in "dusty" surfaces which can become semi-porous.

This does not matter for a material intended for industrial gloves for example, which has a thickness of 1200 μm, but it could be a significant feature with regard to the surfaces of gloves having an overall thickness of 250 to 400 μm. To address this, it is often desirable to overlay the parison with a layer of the same or a compatible polymer or elastomer simultaneously with parison formation by, coextrusion. This allows a fine layer of polymeric material of about 5 to 10 μm to overlay the inventive material. It will also be appreciated that for different purposes, the relative thickness and purpose of the layers can be altered at will to provide, for example, a relatively thick platelet free outer layer (or vice-versa).

For example the inner and outer surfaces of the puncture resistant material in accordance with the present invention can thus be sealed and the outer surface can be made to have different characteristics than the inner surface. Thus the outer surface may be made to assist gripping whereas the inner surface may be made with a low friction surface to allow the hand to easily don the glove.

Figure 3:
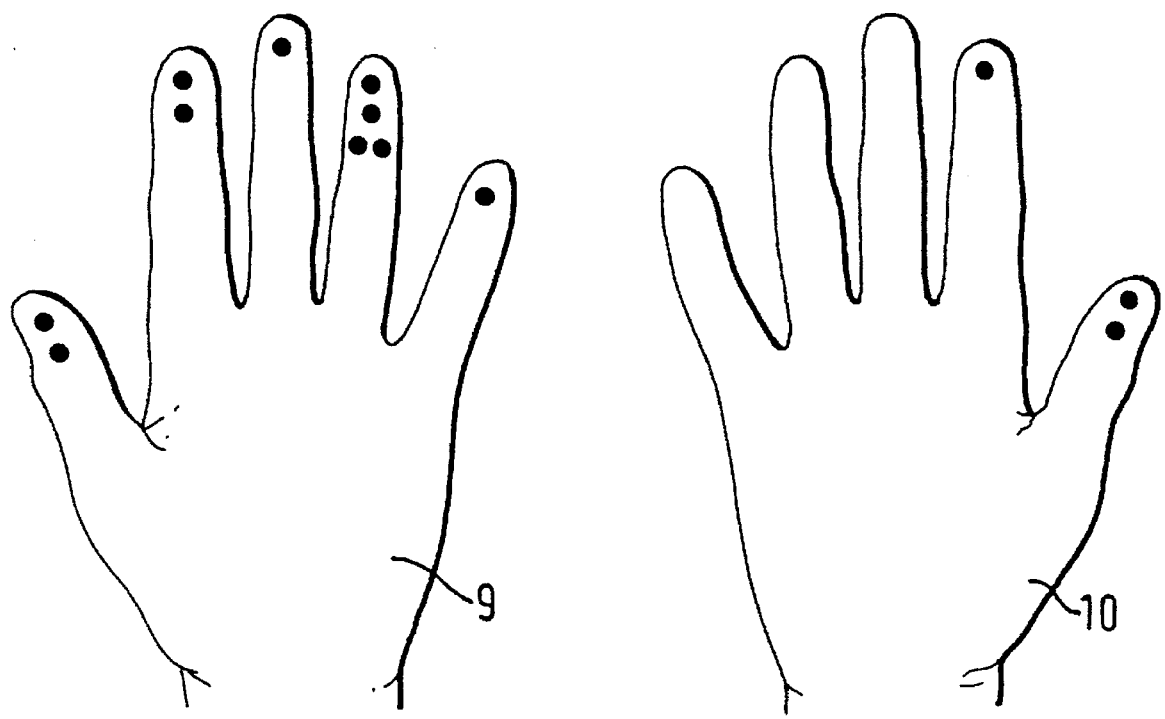
FIG. 3 shows in perspective a pair of hands showing areas venerable to needles to injury.

FIG. 3 shows in perspective a pair of surgeon's hands, namely left hand 9 and right hand 10. On each hand there are shown a number of dots representing areas particularly vulnerable to needlestick injury. In this connection it has been reported that of all hospital related injuries to employees, the highest percentage (35%) is caused by needlestick and other sharp object (sharps) injuries, (British Journal of Nursing, 1992, Vol 1, No 8, Pages 389 to 390). Furthermore form a study reported in the publication British Journal of Surgery 1988, Vol 75, April, pages 314 to 316, the overall perforation rate of surgical gloves used in general surgical procedures was 37.5%.

Figure 4:
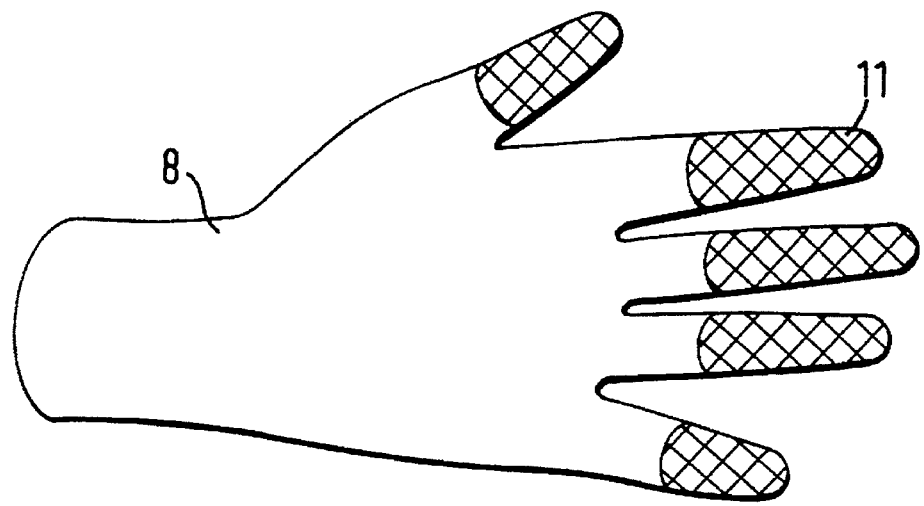
FIG. 4 shows the material of FIG. 1 made into the shape of a surgeon's glove.

FIG. 4 shows a glove made according to the preferred method described in relation to FIG. 2. Hatched areas 11 represent portions on such a glove which may be additionally reinforced, bearing in mind the vulnerable areas shown in FIG. 3. These areas may alternatively represent portions of material according to the preferred embodiments of the invention, which are applied to existing gloves to increase their resistance to puncture in the vulnerable areas.

EXAMPLE 2

Figure 6A:
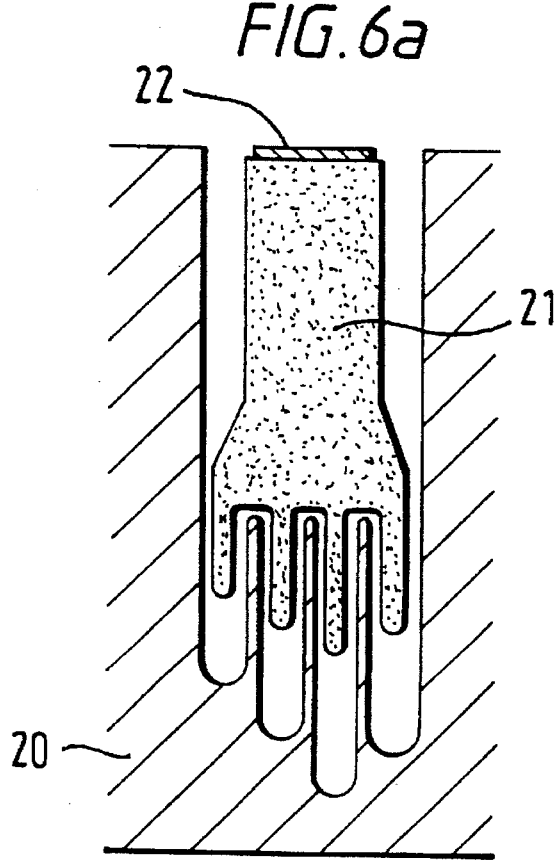
FIGS. 6a and 6b show in vertical cross-section a mould and a preform for use therewith.
Figure 6B:
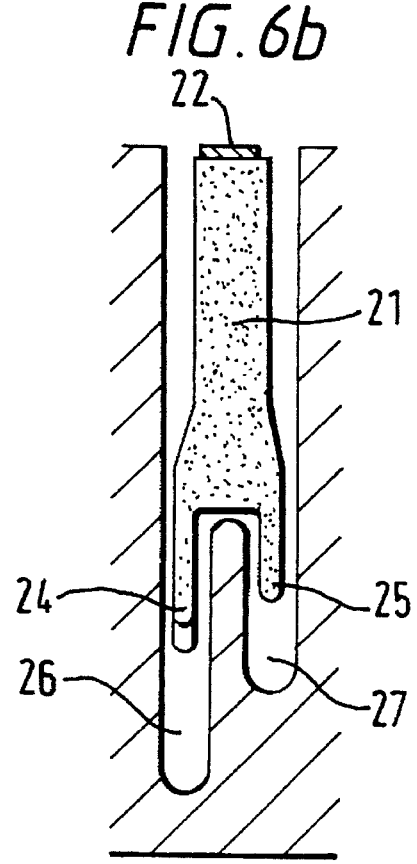
Figure 7A:
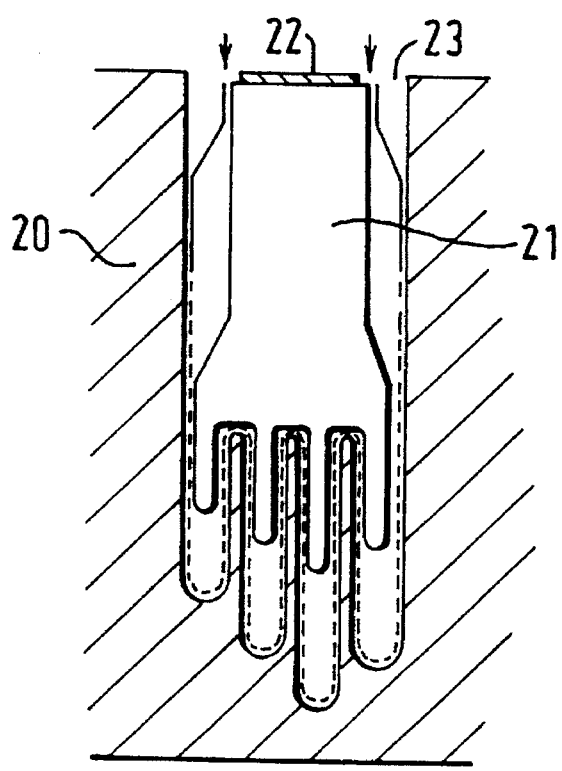
FIGS. 7a and 7b show in vertical cross-section a second stage of the pressure-forming process.
Figure 7B:
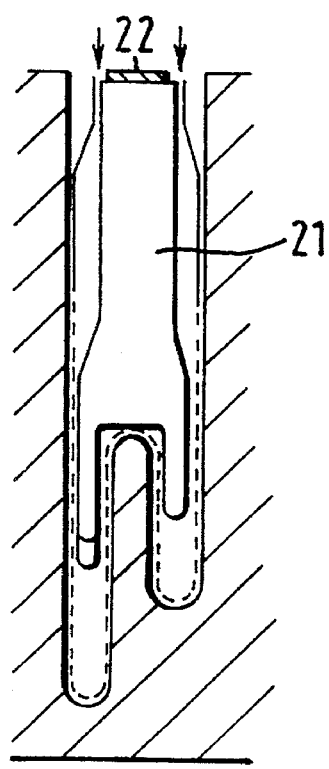

The production of a seamless pre-form and a glove formed therefrom was effected as shown in FIGS. 6 and 7 by:

(1) Creating a one piece female tool (20) into which the pre-form is blown. This does not create seams or flash. The tool can be cast and not machined and therefore is relatively inexpensive to produce.

(2) A pre-form male tool (22) is used to create a pre-form (21) of the polymer/platelet composite from either a hot melt or solvented polymer base. The pre-form (21) is of a size, relative to the female tool (20), that will allow suitable biaxial orientation of the platelet/polymer composite to occur during the blowing or vacuum forming phase, thus the allowed extension should be equal to, or exceed 1.25.

(3) When the pre-form (21), still attached to the pre-form tool (22), is inserted into the female tool, an air seal is formed at the neck (23) of the female tool (wrist end) and the pre-form is inflated via a device in the pre-form tool. A vent for air trapped in the cavity of the female tool is provided if necessary. Since the pre-form and the pre-form tool extend into the female tool to a point where the pre-form finger (24) and thumb (25) sections extend into the top of their respective finger (26) and thumb (27) cavities of the female tool, when the pressure applying phase commences, inflation of the pre-form must occur with the fingers and thumb extending into their respective cavities. Thus the need to stretch blow is eliminated.

(4) After forming, the pre-form tool (22) is withdrawn (since it is of smaller diameter) through the neck (23) of the female tool. The formed glove is then sucked out of the female tool ready for packaging etc. Since the only flash generated is at the wrist end of the glove that can be quickly removed before the glove is sucked out of the tool.

The invention applies therefore to a method for the manufacture of a puncture resistant sheet, to a puncture resistant article formed thereby and to a parison therefor.

We claim:

1. A puncture resistant polymeric sheet material comprising a plurality of discrete platelets disposed substantially parallel to the plane of the sheet material in an overlapping interrelation, characterized in that the orientation of the platelets in the sheet material has been effected by subjecting a mixture of the platelets and a polymeric material to externally applied positive or negative pressure in a forming process to align the platelets within the polymeric material.

2. A material according to claim 1 wherein the platelets are ceramic, wherein the polymer is an elastomer, and wherein the forming step is a blow moulding process, the platelets having a width about 10 to 15 microns and a thickness of about 1 to 5 microns.

3. A material comprising a plurality of discrete platelets disposed substantially parallel to the plane of the sheet material in an overlapping interrelation, characterized in that the orientation of the platelets in the sheet material has been effected by subjecting a mixture of the platelets and a polymeric material to externally applied positive or negative pressure in a forming process to align the platelets within the polymeric material, wherein the sheet material further comprising a co-extruded layer of another polymeric material overlaying the sheet material.

4. A material according to claim 1 wherein the material has a thickness of more than 200 μm and can withstand a needlepoint loading above 500 grams.

5. A glove formed from a material according to claim 1.

6. A method of manufacturing a puncture resistant sheet or article of clothing comprising the steps of:

(a) mixing discrete platelets with a polymer to form a mixture wherein the platelets are randomly oriented, (b) curing the mixture optionally under pressure and/or heat to form a parison, and subsequently (c) heating the parison and subjecting it to an externally applied positive or negative pressure to form a sheet or article of clothing in which at least a majority of platelets are pressure oriented so as to be aligned in overlapping relationship generally parallel to opposed faces of the material forming the sheet or article of clothing.

7. A method as claimed in claim 6 wherein the parison is formed by injection, extrusion or vacuum moulding.

8. A method according to claim 6 wherein another polymer is co-extruded onto at least one surface of the parison.

9. A method according to claim 6 wherein the forming step is effected by a blow moulding process.

10. A parison for a puncture resistant article, said parison comprising an elastomer formed with 10 to 60% by weight of ceramic platelets, overlayed on the surface thereof with a polymeric material by co-extrusion.

11. A method for the creation of a moulded shape which comprises (a) creating a one piece female mould of desired shape, (b) utilizing a pre-form tool to create a polymer/platelet preform from a hot melt or solvent base, said preform being smaller than the female tool, but sealable thereto at one end, and (c) applying positive or negative pressure to the preform with heating so as to cause the material to undergo biaxial stretching while taking up the form of the female mould; thereby to provide a biaxially stretched product.

12. The material according to claim 1 wherein the platelets have a width between about 10 and 15 microns and a thickness between about 1 and 5 microns.

* * * * *